United States Patent [15] 3,687,882
Bishop [45] Aug. 29, 1972

[54] SILANE-TITANATE DISPERSIONS FOR COATING ALUMINUM
[72] Inventor: Ernest M. Bishop, Livermore, Calif.
[73] Assignee: Nexcel Corporation, Dublin, Calif.
[22] Filed: April 29, 1971
[21] Appl. No.: 138,793

[52] U.S. Cl. .260/29.2 M, 117/132 BS, 117/161 ZA, 260/33.4 SB, 260/46.5 E
[51] Int. Cl. ...... B32b 15/08, C08g 31/24, C09d 3/84
[58] Field of Search..260/29.2 M, 46.5 E, 2 S, 46.5 G; 117/132 BS, 135.1, 125 GS

[56] References Cited

UNITED STATES PATENTS

| 2,512,058 | 6/1950 | Gulledge | 260/46.5 E |
| 2,721,855 | 10/1955 | Kin | 260/46.5 E |
| 3,153,000 | 10/1964 | Takimoto et al. | 260/46.5 E |
| 3,258,382 | 6/1966 | Vincent | 117/126 GS |
| 3,312,622 | 4/1967 | Pines et al. | 260/29.2 M |
| 3,368,928 | 2/1968 | Chadha et al. | 260/2 S |
| 3,395,036 | 7/1968 | Campbell | 117/126 GS |
| 3,627,565 | 12/1971 | Plueddemann | 117/126 GN |

Primary Examiner—Julius Frome
Assistant Examiner—A. H. Koeckert
Attorney—Townsend & Townsend

[57] ABSTRACT

Composition and method are provided for enhancing adhesive bonding to an aluminum surface and protecting the aluminum surface from corrosive and other chemical degradation. The improved bonding surface comprises a composition derived from cohydrolysis of a diamino-substituted silane and a titanate. The corrosion resistant composition is derived from a cohydrolysed composition of an oxysubstituted silane and a titanate, combined with hexavalent chromium. The compositions may be applied by any convenient means in a liquid media to the aluminum surface, preferably cleaned prior to application of the above compositions.

10 Claims, No Drawings

SILANE-TITANATE DISPERSIONS FOR COATING ALUMINUM

BACKGROUND OF THE INVENTION

1. Field of the Invention

Aluminum, as thin sheeting or foil, finds a wide variety of uses. In many of its uses, the aluminum is subjected to oxidative or other corrosive environments which result in chemical modification of the aluminum surface, frequently to a significant depth. In large aluminum objects, the chemical modification frequently, although not always, results in passivating the surface so as to make it relatively inert to further chemical modification. However, with thin films or sheets, particularly where two sides may be exposed, the depth of the passivating layer may be such as to seriously change the physical properties of the aluminum and make the aluminum unsatisfactory for its function. This has been found to be particularly true in uses of aluminum foil, such as in the fabrication of honeycomb. Therefore, it is important when using aluminum sheets or films of a fraction or a few mils thickness, to have a protective coating which inhibits chemical modification of the aluminum surface.

It is also found with aluminum, that many of the common adhesives for bonding one aluminum surface to another do not provide sufficient strength or adherence between the adhesive and the aluminum surface, even after curing. It is therefore desirable to modify the aluminum surface or provide a surface which will bond to the aluminum or protective coating on the aluminum and then bond to an adhesive, so as to form a strong continuous bond from one aluminum surface to another.

2. Description of the Prior Art

U. S. Pat. Nos. 2,921,858, 3,063,877, and 3,189,489 all describe various modifications of the use of a partially reduced hexavalent chromium composition for protection of aluminum and other metallic surfaces.

U. S. Pat. No. 3,066,060 discloses a variety of resin adhesives for structural metallic members. Titanate-siloxane compositions have been used in alcohol media which were substantially anhydrous.

SUMMARY OF THE INVENTION

Coating compositions are provided for aluminum and aluminum alloys which provide protection from chemical modification, particularly corrosion, and enhance adherence of an adhesive to the aluminum surface by employing a combination of a silane and a titanate. For adherence, amino functionalities are present in the silane, whereas for corrosion protection, oxy functionalities are present. Included with the silane-titanate composition for corrosion protection is partially reduced hexavalent chromium.

DESCRIPTION OF THE SPECIFIC EMBODIMENTS

In the subject invention, an adherent coating is provided for aluminum or aluminum alloys by applying to an aluminum surface, a solution containing a combination of silane and titanate esters, which have been combined in an aqueous media to at least partially copolymerize the silane and titanate.

The silane employed is a tetraalkyl silane, wherein the alkyl is of from one to six carbon atoms, preferably of from one to three carbon atoms, and preferably having primary attachment to the oxygen and wherein one or more of the alkyl groups, preferably only one, is bonded through the amine nitrogen atom to an alkylene diamine, wherein the alkylene group is of from two to three carbon atoms, there being at least two carbon atoms between the nitrogen atoms. The silane employed will for the most part have the following formula:

$$H_2NR''NHR'—Si(OR)_3$$

wherein the R's may be the same or different and are alkyl of from one to six carbon atoms, preferably of from one to three carbon atoms and having primary attachment to the oxygen atom, R' is of from two to six carbon atoms, preferably of from two to three carbon atoms, there being at least two carbon atoms between the silicon and the nitrogen atoms, and R'' is alkylene of from two to three carbon atoms, there being at least two carbon atoms between the nitrogen atoms.

The silane compounds will have at least seven carbon atoms, more usually at least 12 carbon atoms and will usually have fewer than 25 carbon atoms, more usually fewer than 20 carbon atoms. The silane will have at least two amine nitrogen atoms, normally one primary and one secondary, and generally not more than four amine nitrogen atoms.

Illustrative silane compounds include 4,7-diazaheptyltrimethoxysilane, 3,6-diazahexyltriethoxysilane, 3,6-diazahexyltrimethoxysilane, 5,8-diazaoctyltrimethoxysilane, etc.

The titanate employed is a tetraalkyl titanate, usually as a chelate of a 1,3-dioxo compound. The alkyl groups will normally be of from one to six carbon atoms, more usually of from two to four carbon atoms, and preferably having secondary attachment to the oxygen. The chelating group will be of from three to eight carbon atoms, more usually of from four to six carbon atoms, and preferably will have two oxocarbonyl groups, separated by one carbon atom (alpha, gamma).

For the most part, the titanate compounds will have the following formula:

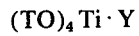

$$(TO)_4Ti \cdot Y$$

where T is alkyl of from 1 to 6 carbon atoms, more usually of from two to four atoms, e.g., methyl, ethyl, isopropyl, isobutyl, sec.-butyl, etc., preferably having secondary attachment to oxygen. The T's may be the same or different. Y is a dioxo compound, having the oxo oxygen atoms separated by three carbon atoms, and preferably oxocarbonyl, rather than non-oxocarbonyl. Illustrative Y groups include acetoacetone, 3-methylacetoacetone, 3-ethylacetoacetone, 3,5-heptadione, etc.

The titanate compound will normally have from 10 to 36 carbon atoms, more usually from 16 to 30 carbon atoms.

The mole ratio of silane and titanate will usually be at least about 1:1 and normally not more than about 6:1, usually from about 1–4 to 1.

In preparing the composition, the silane and titanate are first mixed in the absence of solvent. The addition of the solvent is then begun, the reaction being exothermic. While a specific rate of addition cannot be provided, care is taken during the addition that the solvent is added sufficiently rapidly, that the composition does not gel. Correspondingly, the solvent is not added so rapidly that a white precipitate appears. The two extremes are easily avoided, by determining the desired rate with a minimum of experimentation.

The solvent is water. However, alkanols of from 1 to 3 carbon atoms may be added in from 1 to 10 volume percent. Water is found to be satisfactory and because of the ease of handling and processing is preferred.

The weight percent of the combination of silane and titanate will usually be at least 5 weight percent of the solution, normally not exceeding 60 weight percent, more usually being in the range of about 10 to 30 weight percent.

The residue is now readily soluble in various solvents, and may be redissolved, if desired, to form a composition having from 5 to 50, more usually from about 5 to 25, weight percent of the siloxane-titanate composition. Water or aqueous alkanols, preferably water, may be employed as the diluent and the solution used to coat the aluminum surface.

Coating may be applied by any convenient means, such as brushing, rolling, spraying, etc. The amount of material required is not critical, preferably, at least 5 mg/ft.$^2$ of material is applied as a nonvolatile residue, more usually at least 10 mg/ft.$^2$ and usually not more than about 35 mg/ft.$^2$, more usually not more than about 25 mg/ft.$^2$. After application, the coating may be dried by any convenient means, evaporation with the aid of warm air being satisfactory.

The aluminum employed may be pure aluminum or alloy with from 0 to 15 weight percent of another metal, such as magnesium or copper. Preferably, the aluminum surface is cleaned prior to application of the silane-titanate composition. Various methods of cleaning the aluminum surface may be employed, preferably a mild alkaline cleaner is used. Illustrative alkaline cleaners include sodium polyphosphate, sodium sesquicarbonate, etc., in an aqueous medium at a pH greater than 8, and usually in combination with a nonionic wetting agent. These types of cleaners are conventional and various cleaners are disclosed in the prior art. Alternatively, acid cleaners could be used.

The corrosion protective coatings employ the same titanates as were employed in the adhesive coating, but employ a different silane, and have, in addition, hexavalent chromium.

The silane which are employed have from 1 to 2 oxysubstituted aliphatic groups, more usually 1, bonded through carbon to silicon, and the remaining valences satisfied by lower alkoxy groups of from one to six carbon atoms, preferably of from one to three carbon atoms. The silane which find use in the subject composition will for the most part have the following formula:

$$Y'—R'''Si(OR)_3$$

wherein R has been defined previously, R''' is an alkylene group of from two to six carbon atoms, more usually two to four carbon atoms, and Y' is an aliphatic group having from one to three oxy functionalities, preferably at least one oxy functionality, which is hydroxy or capable of producing hydroxy upon hydrolysis e.g. epoxy. Illustrative Y's are glycidoxy, glyceroloxy, 2-oxrianyl, 3-hydroxypropyloxy, 4-(1,3-dioxanyl), 4-(1,3-dioxacyclopentyl), etc.

The mole ratio of silane to titanate will normally be at least about 1:1 and usually not more than 6:1, preferably from about 1–4:1.

The ratio of chromium to the silane-titanate compounds originally charged, will normally be at least one part per part of the silane-titanate originally charged and not more than about 4 parts, preferably from about 1.5 to 3 parts. The chromium may be employed as chromium trioxide, sodium dichromate, ammonium dichromate, potassium dichromate, etc., the particular form in which the hexavalent chromium is introduced not being critical to this invention.

In preparing the composition for the protective coating, the silane and titanate are combined and a small amount of water or aqueous lower alkanol (one to three carbon atoms) is added. The amount of hydroxylic solvent will normally be not greater than 1 part to 1 part of combined silane-titanate. If water is used solely, which is preferred, the amount of water which will be employed will usually not be more than about 0.5 parts, and more usually not more than about 0.3 parts per part of silane and titanate. Included in the composition is a small amount of acid catalyst. Various weak or strong acids may be used, the amount varying with the strength of the acid. With carboxylic acids, usually, from about 1 to 5 weight percent of the total composition will be employed. With stronger acids, the amount may be as low as 0.1 weight percent.

The composition is heated to a temperature of at least 80° C, more usually at least 90° C, and usually not exceeding 125° C, more usually not exceeding 110° C. The volatile material is taken overhead and the composition becomes extremely viscous. The composition is heated until at least about 75 percent of the theoretical volatile materials is taken over, more usually at least about 90 percent. The theoretical amount of volatile material is determined by heating at the desired temperature till no further material comes overhead. The resulting residue is a very viscous composition which is readily soluble in water and alkanols and is dissolved to form a 10 to 50 weight percent solution, preferably a 15 to 30 weight percent solution in water or aqueous alkanol, preferably water.

In a preferred embodiment of this composition, particularly when the composition is to be used for aluminum which must be adhered through an organic adhesive to another surface, e.g., as in honeycombs, a small amount of colloidal alumina or fumed alumina is added. The amount will normally be from about 25 to 150, more usually from about 50 to 75 weight percent based on the cohydrolyzed silane-titanate composition. Conveniently, the colloidal alumina is first dispersed in an aqueous medium to form a relatively homogeneous dispersion. The colloidal alumina will normally be dispersed in amounts of from about 1 to 20 gms. per 100 ml. of water. The aqueous solution of the cohydrolyzed silane-titanate and aqueous dispersion of the colloidal alumina are readily combined by mixing until a relatively homogeneous composition is achieved.

To the combination of the cohydrolyzed silane-titanate and alumina, if present, is added hexavalent chromium either as a solid, powder or, preferably, as an aqueous solution. The addition of hexavalent chromium results in the evolution of substantial amounts of heat, so that for convenient control of the addition, it is preferable to use a solution. While the solid chromium compound can be used, it could only be added slowly, with efficient agitation, and care in avoiding localized high concentrations.

The hexavalent chromium will normally be added as a 2 to 30 weight percent solution, more usually a 5 to 25 weight percent solution based on chromium.

The final volume may then be adjusted to provide a final composition having from about 10 to 40 weight percent, preferably from about 15 to 25 weight percent of solids. The solution is now ready to be applied directly onto the aluminum surface.

Preferably, prior to coating the aluminum surface, the surface is cleaned with an alkaline cleaner, as described previously. The method of application to the surface is not critical, and any convenient method can be employed, such as spraying, brushing, roller coating, etc. The amount of coating provided will normally provide from about 5 to 70 mg. per square foot of surface, more usually 10 to 60 mg. per square foot of surface. Usually, the surface is then dried by heating for from about 5 to 50 seconds with hot air at a temperature of at least about 250° F, and usually not exceeding about 350° F, preferably about 300° F.

To illustrate the invention, N-(β-aminoethyl) γ-aminopropyl trimethoxysilane was combined with the acetoacetonate chelate of tetraisopropyl titanate in a mole ratio of 2.5:1 in water to provide a 5 weight percent solution. (The silane-titanate composition was prepared by adding water at the appropriate rate to the mixed silane and titanate to obtain a 5 weight percent solution.) Aluminum foil of about 1.3 ml. thickness (5052) was passed through the solution to provide a coating of from about 5 to 10 mg. per square foot of surface. The coating was then dried, using hot air at about 300° F for from about 5 to 30 seconds, till the surface was no longer tacky. The subject surface was then found to provide excellent bonding with a wide variety of adhesives normally used in the node bonding of aluminum honeycomb. Adhesives which were tried were nitrile phenolics, as described in U. S. Pat. No. 3,066,060, nylon modified epoxies, and epoxylated phenol formaldehyde resins. All of these adhesives were found to provide excellent bonding to the aluminum surface.

In a second test, a corrosion resistant composition was prepared by combining 14.9 gm. of DC Z-6040 (γ-glycidoxypropyltrimethoxy silane), 14.4 gm. of Tyzor AA (the acetoacetonate chelate of tetraisoproproxy titanate), 1.5 gm. of acetic acid and 10.0 gm. of water (the composition is not miscible with significantly larger amounts of water). The mixture was heated to reflux temperature and materials taken overhead, the composition in the pot becoming significantly more viscous during the distillation. Taken overhead was 12.5 gm. which, excluding water, was found to be 39 weight percent methanol, 46 weight percent propanol, 0.8 weight percent acetic acid and 7 weight percent acetoacetone. The residue was then dissolved in water to provide a 20 weight percent solution. About 12 gm. of Alon (colloidal alumina supplied by Cabot Corp.) was dispersed in 200 ml. of water and the two solutions combined with stirring. Approximately 90 gm. of chromium trioxide was then dissolved in 200 ml. of water and the solution slowly added with stirring to the combined solutions of the silane-titanate and Alon. The reaction was highly exothermic, which is believed to be a result of reduction of the hexavalent chromium. After allowing the mixture to cool to room temperature, the solution was ready for use.

Aluminum foil (1.3 mils thickness, 5052) was passed through the solution so as to provide a coating of about 30 to 60 mg. per square foot of surface. The coating was dried by heating in hot air at 300° F for 15 seconds. The coated aluminum foil was then passed through a 5 weight percent solution of the Tyzor AA and N-(β-aminoethyl)γ-aminopropyl trimethoxysilane (1:2.5 mole ratio). The coating provided 10–20 mg. per square foot of surface.

The resulting coated aluminum foil was found to be extremely corrosion resistant as provided for under MIL–C–5541. The coatings not only protect aluminum, but also aluminum alloys having magnesium, the 5,000 series alloys and aluminum alloys having copper, the 2,000 series alloys, even with as much as 4 to 5 percent copper. The copper containing alloys are particularly difficult to protect, because the copper tends to migrate to the surface, and in a corrosive atmosphere form an electrolytic cell with the aluminum. In addition, the surface coating provided excellent bonding to a wide variety of adhesives, a number of which have been discussed previously.

It is evident that the subject invention provides desirable protection to aluminum surfaces, preventing corrosion and significant chemical change in the aluminum, with resulting change in the physical properties of the aluminum. In addition, the aluminum is readily bonded to a wide variety of adhesive compositions, forming strong bonds from aluminum to another surface. In addition, the coating of the compositions is easily controlled in providing the desired amount of material on the aluminum surface, by employing an aqueous medium from which the compositions adhere to the aluminum surface.

What is claimed is:

1. A composition useful in coating aluminum surfaces to provide enhanced bonding to organic adhesives which comprises a 5 to 50 weight percent aqueous dispersion of an aqueous reaction product of a silane and a titanate in a mole ratio of 1–6:1, wherein said silane is of the formula:

$$H_2NR''NHR'—Si(OR)_3$$

wherein R is alkyl of from one to six carbon atoms, R' is alkylene of from two to six carbon atoms, and R'' is alkylene of from two to three carbon atoms, there being at least two carbon atoms between the nitrogen atoms; and said titanate is of the formula:

$$(TO)_4Ti·Y$$

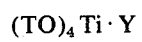

wherein T is alkyl of from one to six carbon atoms, and Y is a 1,3-dioxo compound of from three to eight carbon atoms.

2. A composition according to claim 1, wherein R is methyl, T is isopropyl and Y is acetoacetone.

3. A composition useful in providing corrosion protection for aluminum and aluminum alloys which comprises an aqueous reaction product of a silane, a titanate, and a hexavalent chromium compound, comprising a 5 to 50 weight percent dispersion in a hydroxylic medium having a mole ratio of silane to titanate of 1–6:1, wherein said silane is of the formula:

$$Y'-R'''Si-Si-(OR)_3$$

wherein R is alkyl of from one to six carbon atoms, R''' is alkylene of from two to six carbon atoms, and Y' is an oxy-substituted hydrocarbon radical free of unsaturation of from two to six carbon atoms wherein at least one oxy group is hydroxyl or a group capable of producing hydroxyl upon hydrolysis; said titanate is of the formula:

$$(TO)_4 Ti \cdot Y$$

wherein T is alkyl of from 1–6 carbon atoms, and Y is a 1,3-dioxo compound of from 3–8 carbon atoms; the hexavalent chromium being present in from 1 to 4 parts of chromium per part of silane and titanate.

4. A composition according to claim 3, wherein said silane and titanate are combined in a aqueous medium and heated to remove at least 50 percent of volatile materials at a temperature in the range of about 80° to 125° C.

5. A composition according to claim 4, wherein at least 75 percent of the theoretical volatile materials are removed.

6. A composition according to claim 3, having from 20 to 150 weight percent of colloidal alumina based on the weight of said siloxane-titanate combination.

7. A composition according to claim 3 wherein said siloxane is γ-glycidoxypropyltrimethoxysilane and said titanate is tetraisopropoxy titanate.

8. A composition according to claim 7 wherein the chromium compound is used in an amount to provide 1.5 to 3 parts of chromium per part of silane and titanate, and colloidal alumina in from 50 to 75 weight percent based on said silane and titanate.

9. A method of preparing an adhering protective coating composition for aluminum which comprises; combining neat a silane of the formula:

$$H_2NR''NHR'-Si(OR)_3$$

wherein R is alkyl of from one to six carbon atoms, R' is alkylene of from two to six carbon atoms, and R'' is alkylene of from two to three carbon atoms, there being from two to three carbon atoms between the nitrogen atoms, with a titanate of the formula:

$$(TO)_4 Ti \cdot Y$$

wherein T is alkyl of from 1 to 6 carbon atoms, and Y is a 1,3-dioxo compound of from three to eight carbon atoms in a mole ratio of 1–6:1, and adding water at a rate sufficient to prevent gel formation or formation of a precipitate.

10. A method according to claim 9, wherein said silane is N-β-aminoethyl-γ-aminopropyltrimethoxysilane and said titanate is the acetylacetonate chelate of tetraisopropyl titanate.

* * * * *